US005616182A

United States Patent [19]
Cook

[11] Patent Number: 5,616,182
[45] Date of Patent: Apr. 1, 1997

[54] METHOD AND APPARATUS FOR WIPING A WINDSHIELD

[75] Inventor: Keith R. Cook, Beavercreek, Ohio

[73] Assignee: ITT Automotive Electrical Systems, Inc., Auburn Hills, Mich.

[21] Appl. No.: 566,836

[22] Filed: Dec. 4, 1995

[51] Int. Cl.$^6$ ................................................. B60S 1/04
[52] U.S. Cl. .......................... 134/6; 134/42; 15/250.13; 15/250.29
[58] Field of Search .................. 134/6, 42; 15/250.001, 15/250.13, 250.2, 250.23, 250.29

[56] References Cited

U.S. PATENT DOCUMENTS

| | | | |
|---|---|---|---|
| 2,698,910 | 1/1955 | Blyth | 310/51 |
| 2,827,582 | 3/1958 | Krebs | 310/168 |
| 3,882,567 | 5/1975 | Herzog | 15/250.36 |
| 4,013,829 | 3/1977 | Baar et al. | 358/299 |
| 4,019,434 | 4/1977 | Hoexter | 101/216 |
| 4,320,329 | 3/1982 | Gille et al. | 318/443 |
| 4,362,104 | 12/1982 | Imai et al. | 101/349 |
| 4,413,560 | 11/1983 | Rogge | 101/247 |
| 4,473,920 | 10/1984 | Itani | 15/250.22 |
| 4,499,826 | 2/1985 | Regge | 101/181 |
| 4,527,105 | 7/1985 | Shiraishi | 318/444 |
| 4,544,870 | 10/1985 | Kearns et al. | 318/444 |
| 4,602,562 | 7/1986 | Ottenhues et al. | 101/182 |
| 4,625,157 | 11/1986 | Phillimore | 318/443 |
| 4,634,944 | 1/1987 | Hastings et al. | 318/443 |
| 4,663,575 | 5/1987 | Juzswik et al. | 318/444 |
| 4,672,253 | 6/1987 | Tajima et al. | 310/269 |
| 4,689,535 | 8/1987 | Tsunoda et al. | 318/443 |
| 4,692,645 | 9/1987 | Gotou | 310/184 |
| 4,722,112 | 2/1988 | Schaub et al. | 15/250.36 |
| 4,761,576 | 8/1988 | Savage | 310/51 |
| 4,774,424 | 9/1988 | Habermann | 310/90.5 |
| 4,864,927 | 9/1989 | Niehaus | 101/181 |
| 4,874,975 | 10/1989 | Hertrich | 310/186 |
| 4,890,024 | 12/1989 | Hashimoto et al. | 310/49 R |
| 4,933,584 | 6/1990 | Harms et al. | 310/162 |
| 4,947,066 | 8/1990 | Ghibu et al. | 310/49 R |
| 4,947,092 | 8/1990 | Nabha et al. | 318/444 |
| 4,997,684 | 3/1991 | Franz et al. | 427/384 |
| 5,030,899 | 7/1991 | Nishibe et al. | 318/444 |
| 5,086,245 | 2/1992 | Sieja et al. | 310/216 |
| 5,173,651 | 12/1992 | Buckley et al. | 318/701 |
| 5,184,927 | 2/1993 | Judy | 409/143 |
| 5,239,924 | 8/1993 | Wallmann et al. | 101/179 |
| 5,306,992 | 4/1994 | Dröge | 318/483 |
| 5,331,257 | 7/1994 | Materne et al. | 318/85 |
| 5,430,908 | 7/1995 | Deng | 15/250.21 |

Primary Examiner—Jeffrey Snay
Attorney, Agent, or Firm—Jacox, Meckstroth & Jenkins

[57] ABSTRACT

A wiping system and method for wiping a windshield is shown. The wiping system comprises frictional material or a wiper material which is applied directly to either a wiper blade or a windshield in at least one reversal area on the windshield where the wiping blade is driven from a first direction to a second direction which is generally opposite that of the first direction. The wiper material is coated or integrally formed as part of the windshield in the reversal areas to facilitate increasing the friction between an edge of the wiper blade and a surface of the windshield which, in turn, facilitates causing the blade to flip from a first wipe side to a second wipe side, thereby reducing or eliminating "chisel chatter" problems of the past.

22 Claims, 2 Drawing Sheets

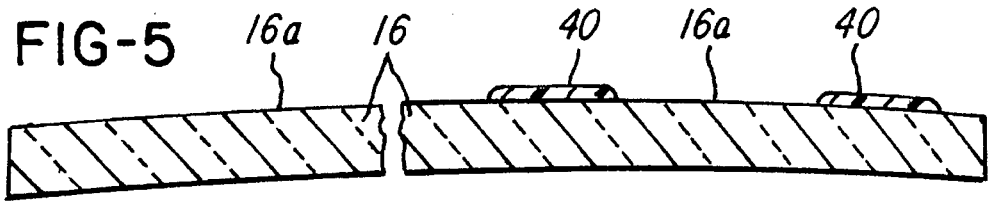
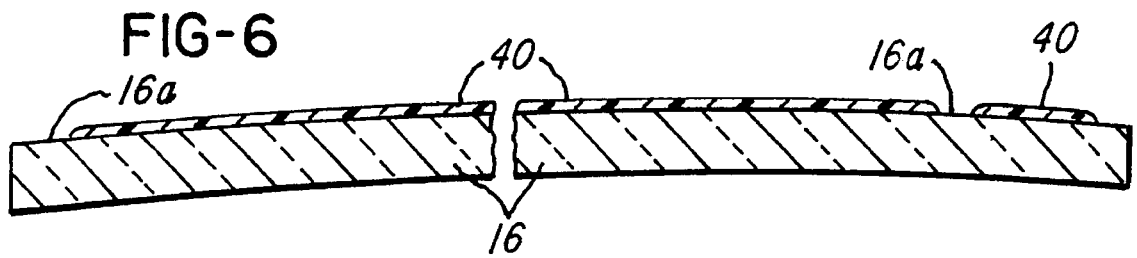
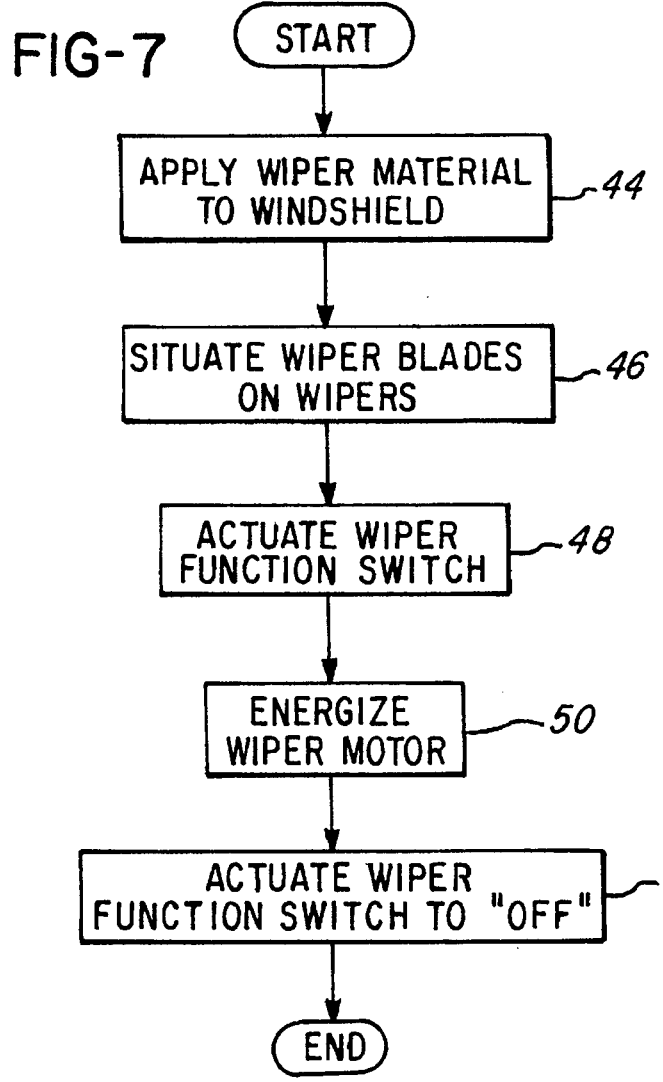

METHOD AND APPARATUS FOR WIPING A WINDSHIELD

BACKGROUND OF THE INVENTION

1. Field of the Invention

This invention relates to a method and apparatus for wiping a windshield, and more particularly, a method and apparatus for applying a frictional coating or material to at least a portion of a windshield to facilitate causing a blade to flip from a first wiping side to a second wiping side.

2. Description of Related Art

In the field of windshield wiping, one of the problems of the prior art involved what is known as "chisel chatter." In general, "chisel chatter" is the result of a wiper blade, such as wiper blade X in FIG. 2, not properly flipping at a reversal point, such as point P in FIG. 2. As best illustrated in FIG. 2, wiper blade X was caused to move from a first direction, indicated by arrow Y, to a second direction, indicated by arrow Z. It was not uncommon that blade B would resist or fail to flip from wiping side B1 to wiping side B2. This caused an edge blade B to skip or jump which, in turn, caused the blade B to not properly squeegee or wipe the surface of windshield WS. This effect was sometimes referred to as "chisel chatter".

This action caused excessive noise and poor wipe quality due to streaks, smears and skips.

SUMMARY OF THE INVENTION

It is, therefore, a primary object of this invention to provide a system and method for wiping a windshield which will facilitate reducing or eliminating the chisel chatter problems of the past.

Another object of this invention is to provide a method and system for wiping a windshield by improving the frictional engagement between a wiper blade and the windshield.

Still another object is to provide a method and system for facilitating causing a wiper blade to flip from a first wipe side to a second wipe side when the wiper blade changes direction in a reversal area on a windshield.

In one aspect, this invention comprises a windshield having at least one reversal area, a wiper associated with the windshield for wiping said windshield, the wiper changing directions in at least one reversal area, and a wiper material situated on the windshield in at least one reversal area.

In another aspect, this invention includes a method comprising the steps of situating a wiper material in at least one reversal area, and causing the wiper blade to reverse directions in at least one reversal area.

In still another aspect, this invention provides a method comprising the steps of wiping the windshield with a wiper blade, and increasing friction between the wiper blade and the windshield in a wiper reverse area in which the wiper blade reverses direction.

In yet another aspect, this invention comprises a windshield; at least one wiper blade situated on the windshield; at least one driver coupled to at least one wiper blade for driving at least one wiper blade across a surface of the windshield; at least one driver also being capable of causing at least one wiper blade to reverse directions in at least one reversal area on the windshield; and friction means situated between at least one wiper blade and the windshield for improving friction therebetween to facilitate causing at least one wiper blade to switch from a first wiper side to a second wiper side.

These and other objects and advantages of the invention will be apparent from the following description, the accompanying drawings and the appended claims.

BRIEF DESCRIPTION OF THE DRAWINGS

FIG. 5 is a sectional view taken along the line 5—5 in FIG. 1;

FIG. 6 is a sectional view taken along the line 6—6 in FIG. 1; and

FIG. 7 is a schematic illustrating the method and process for practicing the invention disclosed herein.

DESCRIPTION OF THE PREFERRED EMBODIMENT

Figure 1:
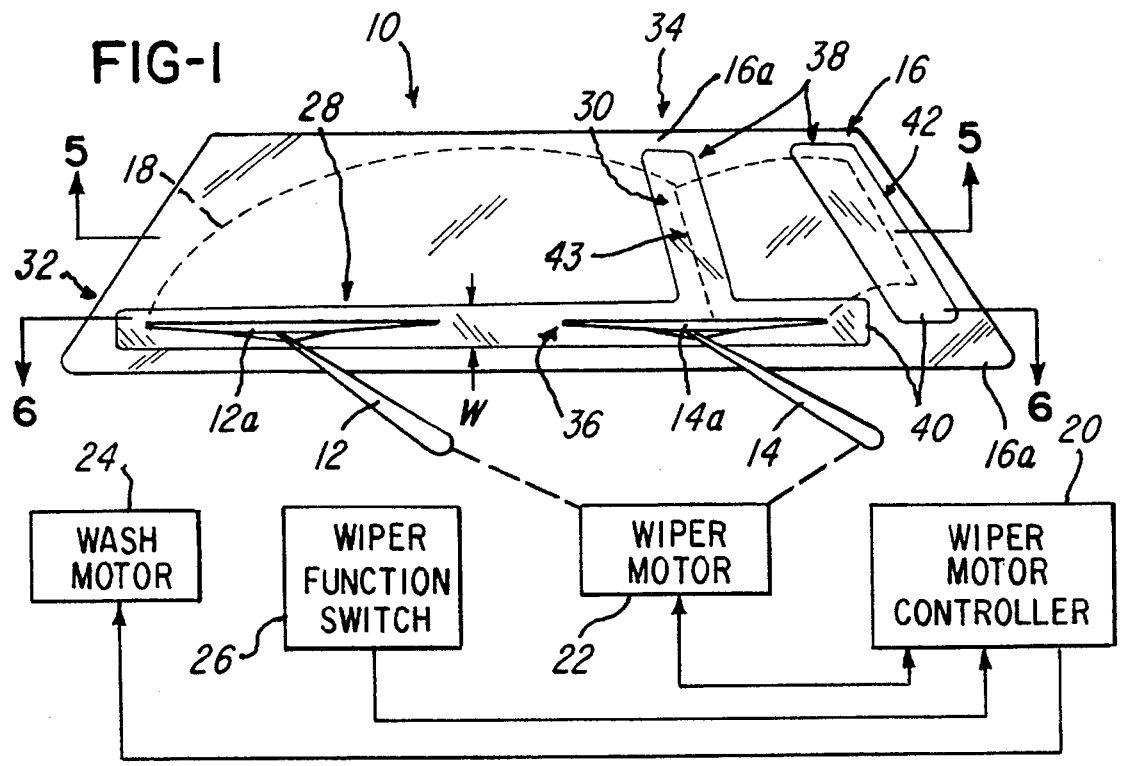
FIG. 1 is an illustration of a wiper system in accordance with the embodiment of this invention.
Figure 2:
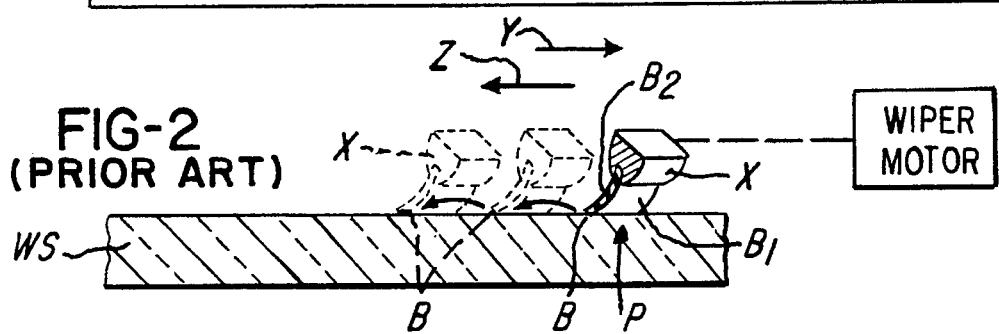
FIG. 2 is a fragmentary sectional view illustrating the wiper blade "chiseling" problems in the prior art.

Referring now to FIG. 1, a wiper system 10 is shown comprising a first wiper 12 and a second wiper 14 for wiping a windshield 16 on a vehicle (not shown), such as a car, truck, farm machinery and the like as shown. The wiper system 10 is suitable for wiping a wiper area 18 in order to remove rain, washer fluid, snow and/or other debris from a surface 16a of windshield 16.

It should be appreciated that the first and second wipers 12 and 14 each comprise a wiper blade 12a and 14a which engages surface 16a in order to wipe the wiper area 18. The wiper system 10 further comprises a wiper motor controller 20 which is coupled to a wiper motor 22 which, in turn, is connected by suitable linkage and drive train (not shown) to the first and second wipers 12 and 14.

The wiper motor controller 20 is also coupled to a washer motor 24 which is capable of pumping a washing fluid (not shown) onto surface 16a in response to a washer signal received from wiper motor controller 20.

The wiper system 10 further comprises a wiper function switch 26 which is coupled to wiper motor controller 20 and which is situated near an operator to enable the operator to operate the wiper system 10.

Advantageously, this invention provides a system and method for reducing or eliminating "chisel chatter" and further for facilitating enabling blades 12a and 14a to reverse directions such that an appropriate or desired wiping side is caused to wipe or squeegee wiper area 18.

The wiper system 10 comprises a first reversing area 28 and a second reversing area 30 in which wiper blade 12a may reverse directions from, for example, an inwipe area 32, where the wiper blades 12a and 14a are generally parallel with a bottom surface or edge 16a of windshield 16, to an outwipe area 34 wherein first wiper 12 is driven such that blade 12a is substantially perpendicular to bottom surface 16a. Likewise, wiper 14 comprises a third reversal area 36 and a fourth reversal area 38 where blade 14a changes directions as it is driven between the inwipe position (shown in FIG. 1) to the outwipe position where blade 14a becomes substantially perpendicular to bottom surface 16a of windshield 16.

The wiper system 10 comprises friction means or a wiper material 40 (FIGS. 1, 3, 5 and 6) which is situated in the first, second, third and fourth reversal areas 28, 30, 36 and 38, respectively. In the embodiment being described, the friction means or friction material is situated or coated onto surface 16a of windshield 16 in order to improve friction between blades 12a and 14a and windshield 16, thereby facilitating causing the blades 12a and 14a to switch from one wiping side to another wiping side. In the embodiment being described, the friction means or wiper material 40 is transparent and may comprise, for example, either perfluoroalkyl alkyl silane or fluorinated olefin telomer, which are available from Fischer Scientific of Pittsburgh, Pa. The wiper material 40 is applied (for example, by spraying) to windshield surface 16a to form a mono-molecular film or coating. In the embodiment being described, the film or coating is cured at 200 degrees Fahrenheit for about 20–30 minutes.

Notice that the wiper material 40 is applied on windshield wiper surface 16a to define a width W (FIG. 1) of about 50–100 mm and a length which exceeds the length of wipers 12 and 14, as necessary to allow for wipe angle variations when the wipers 12 and 14 enter and exit the reversal areas 28, 30, 36 and 38.

Although not shown, it is also contemplated that the wiper material 40 may be impregnated or integrally formed in windshield 16 at the first, second, third and fourth reversal areas 28, 30, 36 and 38, as desired.

Figure 3:
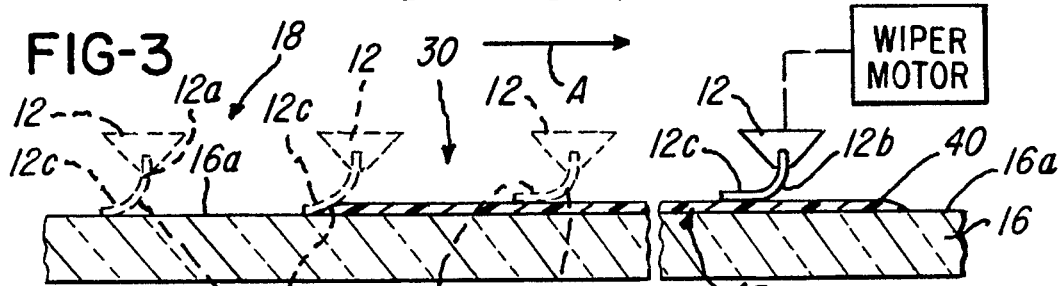
FIG. 3 is a fragmentary sectional view illustrating a method and apparatus of the present invention.

The method and system of the present invention will be described relative to the operation of wiper 12 for ease of illustration, but it should be appreciated that wiper 14 operates in substantially the same manner. As illustrated in FIG. 3, the first wiper 12 comprises the blade 12a having a first side 12b and a second side 12c. In the embodiment being described, it is preferable to have the side (i.e., side 12b or 12c in FIGS. 3 and 4) which is closest to the direction of travel of the first wiper 12 engage surface 16a of windshield 16 when blade 12a squeegees the surface 16a. Thus, as illustrated in FIG. 3, when first wiper 12 moves in the direction of arrow A, it is preferable to have side 12b of wiper blade 12a wipe or squeegee material, such as water, away from wiper area 18. Notice that, as the first wiper 12 moves in the direction of arrow A to the second reversal area 30 and onto friction means or wiper material 40, it is moved to a reversing position 43 (FIGS. 1 and 3).

Figure 4:
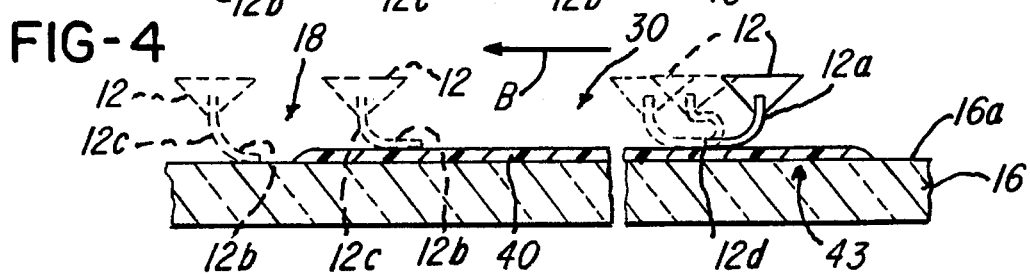
FIG. 4 is a fragmentary sectional view similar to that of FIG. 3 showing a wiper blade reversing direction on a wiper material in a reversal area on a windshield.

As best illustrated in FIG. 4, after the wiper blade 12a of first wiper 12 has been driven to the reversing position 43, edge 12d of wiper blade 12a remains frictionally engaged against wiper material 40. Notice that edge 12d remains substantially stationary relative to an upper portion 12e (FIG. 4) of first wiper 12 as first wiper 12 reverses directions and begins moving in the direction of arrow B in FIG. 4. As the first wiper 12 continues to move in the direction of arrow B, the wiping side of 12c of wiper blade 12a becomes engaged against wiper material 40 and ,thereafter, surface 16a. This causes wiper side 12c to wipe or squeegee material, such as rainwater or washer fluid, away from wiper area 18 (FIG. 1).

It should be appreciated that wiper blade 12a operates in substantially the same manner in the first reversal area 28 as described above relative to the second reversal area 30. Likewise, second wiper 14 operates in the third reversal 36 and fourth reversal area 38 in the same manner as described above relative to the operation of first wiper 12 in the second reversal area 30.

A method for wiping the windshield 16 and for increasing friction between wiper blades 12a and 14a and windshield 16 will now be described relative to FIG. 7.

Initially, the friction means or wiper material 40 is applied or coated to windshield surface 16a of windshield 16 in one or more of the reversal areas 28, 30, 36 and/or 38 (block 44 in FIG. 7). The wiper blades 12a and 14a are then situated on wipers 12 and 14, respectively (block 46). An operator actuates wiper function switch 26 (block 48) which, in turn, causes wiper motor controller 20 to energize wiper motor 22 (block 50) to drive wipers 12 and 14 between the inwipe position 32 and the outwipe position 38. This causes wiper blades 12a and 14a to wipe or squeegee wiper area 18 as they are driven between first and second reversal areas 28 and 30 and third and fourth reversal areas 36 and 38, respectively.

In the manner described earlier herein, as the wipers 12 and 14 reverse directions in their respective reversal areas, 28, 30, 36 and 38, respectively, their blades 12a and 14a frictionally engage wiper material 40. The wiper material 40 provides increased friction between wiper blades 12a and 14a and windshield 16 such that, when the blades 12a and 14a reverse directions, their respective blades 12a and 14a change wiping sides. This facilitates avoiding "chisel chatter" problems of the prior art.

After wiping is complete, the operator may then actuate wiper function switch 26 to an off position (block 52), thereby causing wiper motor controller 20 to cease energizing wiper motor 22. It should be appreciated that the operator may also actuate wiper function switch 26 to cause wiper motor controller 20 to actuate wash motor 24 to spray windshield 16 with a wash fluid (not shown) such that first and second wipers 12 and 14 can wipe the windshield 16 in the manner described earlier herein.

It should further be appreciated that features of this invention may also be used with an automatic wiper system wherein the first and second wipers 12 and 14 are used with a rain sensor such as a capacitively coupled rain sensor of the type shown and described in U.S. Patent ? which is issued to the same assignee as the present invention and which is incorporated herein by reference and made a part hereof.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A wiper system for wiping a windshield comprising:

a windshield having at least one reversal area;

a wiper associated with said windshield for wiping said windshield, said wiper changing directions in said at least one reversal area; and a wiper material situated on said windshield only in said at least one reversal area;

wherein said wiper comprises a blade and said wiper material comprises a friction material which is integral with said windshield and which facilitates causing said blade to flip from a first wipe side to a second wipe side when said blade is driven from a first wipe direction to a second wipe direction, respectively.

2. The wiper system as recited in claim 1 wherein said wiper material comprises a coating applied to said at least one reversal area, each said reversal area comprising a width of not more than 100 mm and a length which exceeds the length of the wiper.

3. The wiper system as recited in claim 1 wherein said coating comprises either perfluoroalkyl alkyl silane or fluorinated olefin telomer.

4. The wiper system as recited in claim 1 wherein said wiper material is fluorinated olefin telomer.

5. A method for wiping a windshield having at least one reversal area; said method comprising the steps of:

defining said at least one reversal area to comprise a width of not more than 100 mm and a length which is greater than a length of a wiper blade situated on said windshield;

situating a wiper material only in said at least one reversal area;

wherein said wiper comprises a blade and said wiper material comprises a friction material which is integral with said windshield and which facilitates causing said blade to flip from a first wipe side to a second wipe side when said blade is driven from a first wipe direction to a second wipe direction, respectively, and causing said wiper blade to reverse directions in said at least one reversal area.

6. The method as recited in claim 5 wherein said method comprises the step of:

applying a coating of said wiper material to said windshield.

7. The wiper system as recited in claim 6 wherein said coating comprises perfluoroalkyl alkyl silane.

8. The method as recited in claim 5 wherein said wiper material comprises:

a transparent friction material.

9. The method as recited in claim 8 wherein said transparent friction material comprises perfluoroalkyl alkyl silane.

10. A method for wiping a windshield comprising the steps of:

wiping the windshield with a wiper blade; and increasing the friction between said wiper blade and said windshield only in a wiper reversal area in which said wiper blade reverses direction; and said wiper reversal area comprising a width of at least 50 mm;

wherein said increasing step further comprises the step of situating a wiper material in said wiper reversal area;

wherein said wiper comprises a blade and said wiper material comprises a friction material which is integral with said windshield and which facilitates causing said blade to flip from a first wipe side to a second wipe side when said blade is driven from a first wipe direction to a second wipe direction, respectively.

11. The method as recited in claim 10 wherein said method comprises the step of:

applying a coating of said wiper material to said windshield.

12. The method as recited in claim 11 wherein said coating comprises either perfluoroalkyl alkyl silane or fluorinated olefin telomer.

13. The method a recited in claim 10 wherein said wiper material comprises:

a transparent friction material.

14. The method as recited in claim 13 wherein said transparent friction material comprises perfluoroalkyl alkyl silane.

15. A wiper system for use on a vehicle, said wiper system comprising:

a windshield;

at least one wiper blade situated on said windshield;

at least one driver coupled to said at least one wiper blade for driving said at least one wiper blade across a surface of said windshield, said at least one driver also being capable of causing said at least one wiper blade to reverse directions in at least one reversal area on said windshield; and friction means situated between said at least one wiper blade and said windshield at said at least one reversal area for improving friction therebetween to facilitate causing said at least one wiper blade to switch from a first wiper side to a second wiper side.

16. The wiper system as recited in claim 15 wherein said friction means is transparent and is applied directly to said windshield.

17. The wiper system as recited in claim 15 wherein said friction means comprises a wiper material situated on said windshield in said at least one reversal area.

18. The wiper system as recited in claim 17 wherein said wiper material comprises a coating applied to said windshield.

19. The wiper system as recited in claim 18 wherein said coating comprises fluorinated olefin telomer.

20. A method for reducing "chisel chatter" in a wiper system comprising a wiper blade having an edge and a windshield, said method comprising the steps of:

increasing friction between said edge of said wiper blade and said windshield by applying a frictional coating only in a reversal area on said windshield where said wiper blade changes direction, said coating being sufficient to facilitate causing said blade to flip from a first wipe side to a second wipe side when said blade is driven from a first wipe direction to a second wipe direction, respectively.

21. The method as recited in claim 20 wherein said method further comprises the step of:

situating said frictional coating on the windshield in said reversal area thereof where said area comprises at least one horizontal area and at least one vertical area.

22. The method as recited in claim 20 wherein said frictional coating comprises perflouroalkyl alkyl silane.

* * * * *